Feb. 4, 1958  B. M. CAMERON  2,821,979
INTRAMEDULLARY SPLINT
Filed May 18, 1953
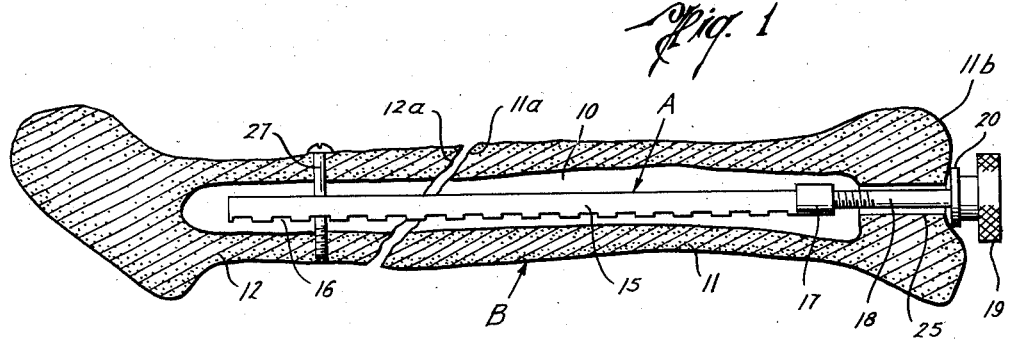
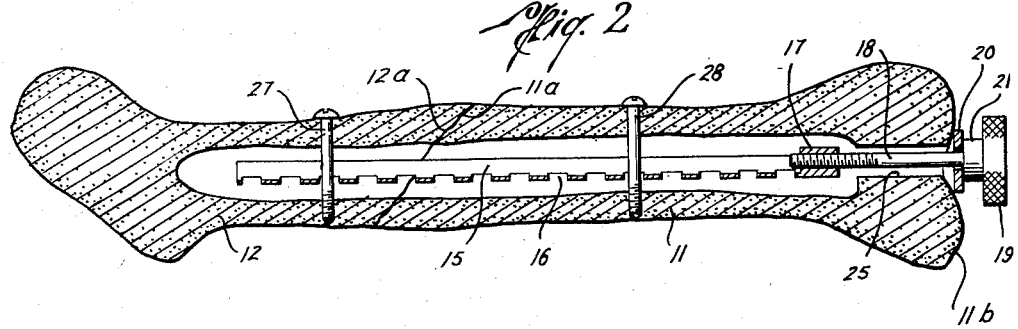
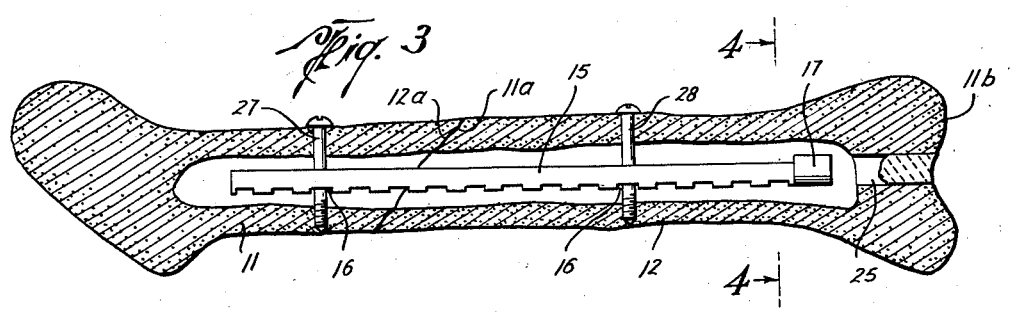
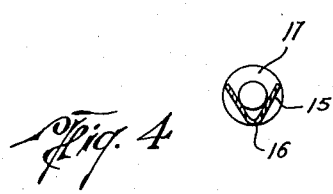
Bruce M. Cameron
INVENTOR.
BY J. Vincent Martin
Joe E. Edwards
B. R. Pravel
ATTORNEYS

United States Patent Office 2,821,979
Patented Feb. 4, 1958

2,821,979
INTRAMEDULLARY SPLINT

Bruce M. Cameron, Houston, Tex., assignor to William E. Stapp, Houston, Tex.

Application May 18, 1953, Serial No. 355,749

5 Claims. (Cl. 128—92)

This invention relates to new and useful improvements in bone retaining apparatus and methods of retaining broken bones in a set condition.

In the setting of a broken bone and the maintaining of the bone fragments thereof in a set condition during the healing of the fracture, it is particularly desirable to place the bone fragments under compression to enhance the rate of healing of the bone fracture. It is also important to hold the bone fragments of the broken bone against relative rotation with respect to each other so as to prevent inadvertent dislocation of the fragments during the healing period. Efforts have been made in the past to obtain these qualities in a bone retaining apparatus, but the prior art apparatus has been unsatisfactory, one of the main objections being that the skin has become infected and that sometimes a tearing of the skin results during the healing of the bone fracture. Also, the usual type of prior art apparatus for setting bones requires some type of cast such as a plaster cast which is unduly heavy and may itself incite infection or other disturbances.

It is therefore an object of this invention to provide a bone retaining apparatus which is adapted to place the bone fragments of a broken bone under compression and to prevent rotation of the fragments during the healing period, wherein no part of the apparatus projects through the skin, during the healing of the bone fracture.

An important object of this invention is to provide a bone retaining apparatus which will maintain the bone fragments of a broken bone under compression and will hold the fragments against relative rotation during the healing period of the bone fracture; said apparatus being positionable within the medullary cavity of the bone, whereby an apparatus is confined within the cavity during the healing period so as to prevent such infection of the skin around the bone as is frequently caused by projections through the skin in conventional bone retaining apparatus.

Another object of this invention is to provide a bone retaining apparatus which is adapted to be disposed within the medullary cavity of a broken bone with the tool being anchored or secured to the bone fragments in such a manner that in many types of fractures no cast will be necessary.

A further object of this invention is to provide a bone retaining apparatus and a method of setting and retaining bone fragments of a broken bone in a set condition during the healing of the bone fracture, wherein the apparatus includes a rod which can be inserted into either the distal or the proximal bone fragment so as to initially align the bone fragments, such rod being thereafter positionable within both bone fragments to permit the anchoring of the rod to the fragments to prevent relative rotation of the fragments and to place the fragments under compression to enhance the healing of the fracture, said apparatus having no portion thereof projecting through the skin during the healing period.

A still further object of this invention is to provide a method of setting and retaining broken bone fragments of a broken bone under compression and fixed against rotation during the healing of the bone fracture, wherein a rod is inserted into the cavities of the bone fragments to align the fragments and a force is applied to the rod to bring the fragments together to place the fragments under compression at the fracture site and thereafter the rod is anchored to the other of the bone fragments to retain the fragments under compression during the healing of the fracture.

The construction designed to carry out the invention will be hereinafter described together with other features thereof.

The invention will be more readily understood from a reading of the following specification and by reference to the accompanying drawings forming a part thereof, wherein an example of the invention is shown and wherein:

Figure 1 is a view, partly in section and partly in elevation, illustrating the position of the apparatus of this invention with the rod thereof within the bone fragments of a broken bone and with one end of the rod anchored to one of the bone fragments.

Figure 2 is a view similar to Figure 1, but illustrating the apparatus after compression has been applied to the bone fragments to bring the fractured ends of the fragments together and after an anchoring pin has been inserted in the other of the bone fragments to securely anchor the rod of the apparatus within the bone.

Figure 3 is a view similar to Figure 1, but illustrating the apparatus after the compressing means has been removed from the rod.

Figure 4 is a sectional view taken on line 4—4 of Figure 3 and illustrates the construction of the preferred type of intramedullary rod.

In the drawings, the letter A designates generally the bone retaining apparatus or device of this invention, which is adapted to be positioned in a medullary cavity 10 of a bone B which has been broken into two fragments, a proximal fragment 11 and distal fragment 12. As will be explained, the bone apparatus A is adapted to place the fractured ends 11a and 12a of the bone fragments 11 and 12 under compression so as to enhance the healing of the fracture.

The bone apparatus A includes an intramedullary rod 15 which is preferably V-shaped in cross-section with a plurality of longitudinally spaced slots 16 formed at the apex of the V. At one end of the intramedullary rod 15 there is formed a threaded sleeve 17 which has internal threads for engagement with an externally threaded shaft 18 which forms a part of the compression means of the apparatus A.

The compression means of the apparatus also includes a cylindrical handle 19 connected to the shaft 18 to effect a rotation of the shaft 18 relative to the sleeve 17. A washer or abutment member 20 is slidably disposed on the shaft 18 and contacts an enlarged flange 21 adjacent the handle 19, whereby such washer 20 can be confined between the enlarged flange 21 and the outer end of one of the bone fragments to apply a compressive force to the bone so as to place the fragments under compression as will be explained in detail hereinafter.

In the use of the apparatus A of this invention for the purpose of carrying out the method of this invention, the intramedullary rod 15 is first inserted into the medullary cavity 10 of the broken bone B. This rod 15 may be used in initially aligning the bone fragments 11 and 12 by inserting the rod 15 into one of the fragments and then turning that fragment until it is aligned with the other fragment so that the rod 15 can then be inserted into the cavity in the other of the fragments. For example, after a passage 25 on the same axis as the cavity 10 and of a large enough diameter to permit the rod 15 to pass therethrough has been drilled or otherwise formed in the fragment 11, then the rod 15 will be placed within the medullary cavity portion of the bone fragment 11 and the bone fragment will be moved until the rod 15 can be moved into the cavity portion of the distal fragment 12. If the proximal fragment 11 is at an angle to its normal direction, and perhaps is even projecting through the skin, the rod 15 can be inserted in a retrograde manner, that is, through the fracture end 11a of the proximal fragment 11, until it projects out through the passage 25 at which time the bone fragment 11 can be aligned with the distal fragment 12 for the insertion of the rod 15 into the cavity portion of the distal fragment 12 as well as the cavity portion of the proximal fragment 11.

Once the rod 15 has been inserted into the cavity of the bone and extends into both of the fragments 11 and 12, a retaining or anchoring screw or pin 27 is passed through the cortices or walls of the bone fragment 12 so as to pass through one of the openings or slots 16 in the apex of the rod 15. The rod 15 is thus held against longitudinal or rotational movement relative to the fragment 12.

The shaft 18, if not previously attached to the rod 15, can then be threaded into the sleeve 17 of the rod 15. When the shaft 18 has been threaded inwardly on the sleeve 17 a sufficient distance to cause the washer 20 to be confined between and in contact with the outer end 11b of the bone fragment 11 and the radial projection 21, continued rotation of the shaft 18 cannot effect further inward movement of the shaft 18 and since the rod 15 is held against rotation by the pin 27, such rotation of the shaft 18 moves rod 15 longitudinally toward the fragment end 11b so as to pull the bone fragment 12 toward the bone fragment 11 until the fractured fragment ends 11a and 12a contact each other and the fragments are placed under compression (Figure 2). Thereafter, the bone fragment 11 is anchored to the rod 15 by a retaining or anchoring screw or pin 28 which is identical with the screw or pin 27 and extends through the cortices of the bone fragment 11 and through one of the slots or opening 16 in rod 15. The bone fragment 11 is thus held against rotation relative to the bone fragment 12 and the fractured ends of the bone fragments 11 and 12 are held under compression.

The compression means which includes the shaft 18, washer 20, radial projection 21 and handle 19 are then threaded out of the sleeve 17 and are removed from the bone. This leaves the rod 15 within the cavity 10 of the bone without any portion of the device projecting through the skin, whereby infection from projecting parts is avoided. In some instances it may be desirable to plug the passage 25 with some suitable material after the compression means has been removed. All incisions which were necessary for the insertion of the rod 15 and the retaining or anchoring pins or screws 27 and 28 are then stitched, bandaged or otherwise medically treated. The rod 15 with the screws or pins 27 and 28 is thus left within the cavity of the bone so as to maintain the bone fragments under compression and to hold the fragments against relative rotation during the healing of the bone fracture. In many instances it will be unnecessary to provide a cast such as the usual plaster cast around the broken bone due to the enhanced strength and the rigid compressive anchoring of the rod 15 to the bone fragments.

After the bone fracture has healed, the rod 15 can be removed by the reinsertion of the shaft 18 into the sleeve 17 and the removal of the pins 27 and 28, whereby the rod 15 can be pulled from the cavity 10 through the passage 25.

It should be pointed out that the particular V shape of the rod 15 in cross-section is preferred because of the strength of such a construction with a minimum of material. Also, this construction of the rod permits ready insertion thereof with the usual drivers or drifts. Furthermore, a particular advantage of the V shaped rod resides in the guiding action of the inclined inner wall surfaces for directing the anchor screws 27 and 28 into the slots 16 of the rod. In this connection, the screws 27 and 28 can be properly inserted through the cortices of the bone so as to enter the slots 16 by the use of preliminary X-ray photographs. In the event either of the screws is unintentionally inserted to one side of the slot 16 through which the screw is intended to be passed, the conical or tapered end of the screw will guide same through the slot. The screws 27 and 28 are preferably of substantially the same width or diameter as the width or diameter of the slots 16 to assure that the rod 15 cannot shift longitudinally after the fragments 11 and 12 have been placed under compression. Although only one screw or pin for each bone fragment has been illustrated, it will be evident that a plurality of such screws or pins may be used for each fragment, and should the bone B have been broken into more than the two fragments illustrated, each bone fragment will generally require one or more screws or pins which are anchored to the rod 15.

It will also be evident that although the invention has been described considering the fragment 11 as the proximal fragment, that is, the one nearest the center of a person's body, and the fragment 12 as the distal fragment, the invention is equally applicable with the fragment 11 as the distal fragment and the fragment 12 as the proximal fragment. It should further be pointed out that the abutment member or washer 20 could be eliminated if the radial flange 21 or the handle 19 is of sufficient size to limit the inward movement of the shaft 18 in the bone cavity. Of course, since the washer 20 is slidable on the shaft 18, it will not rotate during rotation of the shaft 18 so that abrasive action on the bone end 11b is prevented by its presence.

It is believed evident from the foregoing description that a bone setting and retaining apparatus or device has been provided which is capable of being inserted within the medullary cavity of a broken bone for placing the bone fragments under compression during the healing and to also prevent relative rotation of the fragments during such period. The apparatus or device is readily inserted and removable and during the healing period of the bone fracture there are no projections or objects extending from the apparatus through the skin, whereby infection from projections is avoided.

The foregoing disclosure and description of the invention is illustrative and explanatory thereof and various changes in the size, shape and materials, as well as in the details of the illustrated constructions, may be made, within the scope of the appended claims, without departing from the spirit of the invention.

What is claimed is:

1. In a surgical apparatus for setting and retaining the bone fragments of a broken bone in a set condition for healing, an intramedullary rod having openings laterally therethrough for receiving anchoring pins for anchoring the rod to the bone fragments, and a rotatable means connected to one end of said rod to effect a longitudinal movement of the rod, said rotatable means being removable from the rod after the rod has been anchored within the bone fragments, whereby during the healing period of the bone fracture no part of said apparatus projects through the skin.

2. The structure set forth in claim 1, wherein said rod is of a V shape in cross-section and said openings in the rod are disposed at the apex of the V, whereby the anchoring pins are guided by the rod into the openings when such pins are projected through the cortices of the bone for anchoring the rod to the bone fragments.

3. The structure set forth in claim 1, wherein said rod has at one end thereof an internally threaded sleeve, and said rotatable means has an externally threaded shaft which threads within the sleeve, said shaft being of sufficient length to extend from the sleeve when the rod is disposed in a bone cavity to a point outside of one end of the bone, and said rotatable means also including an abutment means disposed on said shaft for limiting inward movement of the threaded shaft into the cavity of the bone, whereby upon rotation of the threaded shaft longitudinal movement of the rod is effected by a co-action between the threads on the shaft and the sleeve.

4. In a surgical apparatus for setting and retaining the bone fragments of a broken bone in a set condition for healing, an intramedullary rod having openings laterally therethrough for receiving anchoring pins for anchoring the rod to the bone fragments, and a compression-applying means connected to one end of said rod to effect a longitudinal movement of the rod and thereby apply compression to the bone fragments to place the same under compression, said compression applying means being removable from the rod after the rod has been anchored within the fragments whereby during the healing period of the fracture no part of said apparatus projects through the skin.

5. A surgical apparatus as set forth in claim 4, wherein said rod is of a V shape in cross section and said openings in the rod are disposed at the apex of the V whereby the anchoring pins are guided by the rod into the openings when such pins are projected through the cortices of the bone for anchoring the rod to the bone fragments.

References Cited in the file of this patent

UNITED STATES PATENTS

| | | |
|---|---|---|
| 2,077,804 | Morrison | Apr. 20, 1937 |
| 2,397,545 | Hardinge | Apr. 2, 1946 |
| 2,614,559 | Livingston | Oct. 21, 1952 |

FOREIGN PATENTS

| | | |
|---|---|---|
| 118,595 | Sweden | Apr. 15, 1947 |
| 893,401 | France | Jan. 31, 1944 |